United States Patent
Hokanson et al.

(10) Patent No.: US 11,233,716 B2
(45) Date of Patent: Jan. 25, 2022

(54) SYSTEM FOR REAL-TIME MONITORING WITH BACKWARD ERROR CORRECTION

(71) Applicant: Arlo Technologies, Inc., Carlsbad, CA (US)

(72) Inventors: Ron Hokanson, Oceanside, CA (US); Chetan Karia, San Diego, CA (US)

(73) Assignee: Arlo Technologies, Inc., Carlsbad, CA (US)

(*) Notice: Subject to any disclaimer, the term of this patent is extended or adjusted under 35 U.S.C. 154(b) by 57 days.

(21) Appl. No.: 15/938,441

(22) Filed: Mar. 28, 2018

(65) Prior Publication Data
US 2019/0306038 A1 Oct. 3, 2019

(51) Int. Cl.
*H04L 12/26* (2006.01)
*H04L 1/08* (2006.01)
*H04L 1/00* (2006.01)

(52) U.S. Cl.
CPC ........ *H04L 43/0829* (2013.01); *H04L 1/0083* (2013.01); *H04L 1/08* (2013.01); *H04L 43/50* (2013.01)

(58) Field of Classification Search
CPC ..... H04L 43/0829; H04L 1/0083; H04L 1/08; H04L 43/50
See application file for complete search history.

(56) References Cited

U.S. PATENT DOCUMENTS

| 5,479,408 | A | * | 12/1995 | Will | G08B 3/1083 |
| | | | | | 340/7.21 |
| 5,918,002 | A | | 6/1999 | Klemets et al. | |
| 6,745,364 | B2 | | 6/2004 | Bhatt et al. | |
| 7,079,854 | B2 | * | 7/2006 | Lee | H04L 1/0026 |
| | | | | | 370/230 |
| 7,180,895 | B2 | * | 2/2007 | Smith | H04L 47/10 |
| | | | | | 370/394 |
| 7,876,677 | B2 | * | 1/2011 | Cheshire | H04L 47/10 |
| | | | | | 370/230.1 |

(Continued)

FOREIGN PATENT DOCUMENTS

| EP | 1 276 282 A1 | 1/2003 |
| EP | 1 487 171 A1 | 12/2004 |
| EP | 2 912 845 B1 | 9/2017 |

*Primary Examiner* — Phung M Chung
(74) *Attorney, Agent, or Firm* — Boyle Fredrickson, SC

(57) ABSTRACT

In an electronic monitoring system, a base station can identify missing video and/or audio ("media") packets from a recording device by detecting gaps between sequence numbers corresponding to media packets received in an encoded media stream. The base station can efficiently avoid individually acknowledging every media packet received from the recording device. However, when missing media packets are identified, the base station can queue non-contiguous sequence numbers for the missing media packets for requesting re-transmission from the recording device in a single message. The base station can request such re-transmission during regular report intervals providing statistics and/or control information, and/or in between such intervals in application-specific messages, subject to a guard time. If the recording device still has at least one missing media packet in an egress queue, the recording device can accordingly re-transmit the missing media packet.

18 Claims, 7 Drawing Sheets

(56) References Cited

U.S. PATENT DOCUMENTS

| | | | |
|---|---|---|---|
| 8,081,635 B2* | 12/2011 | Bekiares | H04N 9/8205 |
| | | | 370/389 |
| 8,214,708 B2* | 7/2012 | Takaku | G08C 25/02 |
| | | | 714/748 |
| 8,429,476 B2* | 4/2013 | Dacosta | H04L 1/1877 |
| | | | 714/748 |
| 8,437,497 B2 | 5/2013 | Fu et al. | |
| 8,752,102 B2* | 6/2014 | Menn | H04L 1/1838 |
| | | | 725/116 |
| 8,806,551 B2* | 8/2014 | Haimi-Cohen | |
| | | | H04N 21/234327 |
| | | | 714/748 |
| 8,850,293 B2 | 9/2014 | Baker et al. | |
| 9,137,703 B2* | 9/2015 | Nadas | H04W 28/0289 |
| 9,515,778 B2* | 12/2016 | Baduge | H04L 1/1816 |
| 9,608,767 B2* | 3/2017 | Liu | H04L 1/0041 |
| 10,264,070 B2* | 4/2019 | Bradley | H04L 65/601 |
| 2002/0095635 A1 | 7/2002 | Wager et al. | |
| 2003/0009717 A1* | 1/2003 | Fukushima | H04L 1/1642 |
| | | | 714/748 |
| 2004/0098748 A1 | 5/2004 | Bo et al. | |
| 2007/0033496 A1 | 2/2007 | Cooklev et al. | |
| 2011/0066703 A1* | 3/2011 | Kaplan | H04L 65/4092 |
| | | | 709/219 |
| 2017/0063497 A1* | 3/2017 | Paniconi | H03M 13/353 |

\* cited by examiner

SYSTEM FOR REAL-TIME MONITORING WITH BACKWARD ERROR CORRECTION

BACKGROUND OF THE INVENTION

1. Field of the Invention

The present invention relates to an electronic monitoring system, and more particularly, to an electronic monitoring system with backward error correction in which a base station can identify missing media packets from a recording device by detecting gaps between sequence numbers corresponding to media packets in an encoded media stream and, when missing media packets are identified, queue sequence numbers for the missing media packets for requesting re-transmission from the recording device in a single message.

2. Discussion of the Related Art

Cameras and microphones have long been used as part of monitoring and/or surveillance systems. More recently, cameras and microphones have been coupled with electronic sensors to detect triggering events, such as a detected motion, to allow recording of an area after a triggering event has occurred.

Such recording devices have also been connected to computers with network access to allow a user to remotely monitor an area with a monitoring device, such as a smart phone or tablet computer. In these systems, real-time or live monitoring of events is possible with the benefit of high speed network connections.

However, providing continuous, high quality video and/or audio to enable real-time monitoring can be challenging, particularly for high definition video and audio. For example, errors in data transmission and/or network congestion can cause packet loss to occur, thereby compromising video and/or audio quality. It is therefore desirable to provide a system which enables real-time monitoring that eliminates one or more of the foregoing disadvantages.

SUMMARY OF THE INVENTION

In an electronic monitoring system, a base station can identify missing video and/or audio ("media") packets from a recording device by detecting gaps between sequence numbers corresponding to media packets received in an encoded media stream. The base station can efficiently avoid individually acknowledging every media packet received from the recording device. However, when missing media packets are identified, the base station can queue non-contiguous sequence numbers for the missing media packets for requesting re-transmission from the recording device in a single message. The base station can request such re-transmission during regular report intervals providing statistics and/or control information, and/or in between such intervals in application-specific messages, subject to a guard time. If the recording device still has at least one missing media packet in an egress queue, the recording device can accordingly re-transmit the missing media packet.

The Real-time Transport Protocol (RTP) and corresponding Real-time Transport Protocol Contra Protocol (RTCP) are well known network protocols for delivering audio and video over Internet Protocol (IP) networks. To facilitate communication between an RTP source, which may be a Real Time Streaming Protocol (RTSP) server, and an RTP client, which may be an RTSP client, a new RTCP APP message can be defined to allow selective acknowledgement of RTP packets from the client back to the source. When gaps in an RTP packet sequence are reported, the sender can re-send the missed RTP packets.

In one aspect, wire free cameras can use RTP over a User Datagram Protocol (UDP) connection to send video and audio data to the base station. A WiFi link can be used between the camera and the base station; however, such a WiFi link may be subject to packet loss. An addition to the RTCP protocol can allow the RTSP client on the base station to request retransmission of lost RTP packets.

When an RTSP client detects a gap in an RTP sequence number, a Selective Acknowledgement APP packet can be sent to the camera. The RTP sequence number of a first missed packet can be sent as the starting sequence number. The RTP sequence number of a last missed packet can be sent as an ending sequence number. Up to 20 gaps can be requested in a single Selective Acknowledgement APP packet. When the camera receives the Selective Acknowledgement APP packet, the camera can check for requested RTP packets. If the packets are still in the camera's RTP egress queue, the packets can be sent again to the base station.

The camera can implement an egress queue. Packets sent to the egress socket can be stored in the egress queue until they age out of the queue. The egress queue can have a finite depth. If the maximum depth is reached, the oldest packet can be removed and freed making room for a new packet. For an RTP packet to be successfully re-transmitted, the RTSP client can detect the missed packet and request retransmission before the camera drops the packet from the egress queue. The camera egress queue can be large enough to store at least one Group of Pictures (GOP) period of video packets. The camera can retain the data for a given GOP period until a next I-frame (a frame that does not require other frames to decode) is transmitted.

There is no need for the RTSP client to acknowledge RTP packets that are received successfully. The RTP packets in the egress queue of the camera can age out and be removed from the egress queue automatically. To avoid excessive RTCP message traffic, the RTSP client can implement a guard time. If a new gap is identified and the RTSP client is within this guard time after sending a previous RTCP message, the RTCP message can be delayed until the guard time expires. An RTCP guard time could be, for example, 50 milliseconds. A standard RTCP receiver report can still be sent by the RTSP client on a regular interval. If unrequested gaps are pending on a regular RTCP receiver report interval, the Selective Acknowledgement payload can be included in the RTCP message. Otherwise, the Selective Acknowledgement payload cam be omitted.

The RTSP client can implement a sort buffer to re-order RTP packets. All packets received can be pushed into a priority queue that may keep the packets in order. A timestamp for each packet can be generated when the packet is received from the RTSP server. When flushing packets from the sort buffer the RTP sequence number can be compared with a next expected sequence number. If the sort buffer is missing the next expected RTP packet, the flushing can stop. However, if the timestamp of the next packet in the sort buffer exceeds a time-out, the flushing of the sort buffer can continue. The aged-out packet can be removed from the queue and a next expected RTP sequence number can be updated accordingly. If at any time a previous RTP sequence number is found in the sort buffer, the packet can be forwarded without updating the next expected RTP sequence number value. A sort buffer time-out could be, for example, 900 milliseconds.

An enhancement can include the RTSP client prioritizing correction of I-frames. When video frames are lost, the video may be corrupt until a next complete I-frame is received. To ensure prompt recovery of the video, emphasis can be made in correcting the I-frame. In one aspect, multiple attempts can be made to recover I-frame packets until a next I-frame is received.

Specifically then, one aspect of the present invention provides a system for real-time monitoring, including: a base station configured to wirelessly receive media packets from a recording device, in which each media packet includes a sequence number indicating a relative order of the media packet in an encoded media stream, in which the base station identifies multiple missing media packets in the encoded media stream by detecting multiple gaps between sequence numbers of media packets received, and in which the base station, upon detecting the gaps, wirelessly transmits a message requesting a recording device to re-transmit the plurality of missing media packets having sequence numbers corresponding to the gaps.

Another aspect of the invention can provide a method for real-time monitoring, including: wirelessly transmitting media packets in an encoded media stream from a recording device, in which each media packet includes a sequence number indicating a relative order of the media packet in the encoded media stream; wirelessly receiving media packets from the recording device at a base station; identifying multiple missing media packets in the encoded media stream at the base station by detecting multiple gaps between sequence numbers of media packets received by the base station; and upon detecting the gaps, wirelessly transmitting from the base station a message requesting the recording device to re-transmit the missing media packets having sequence numbers corresponding to the gaps.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
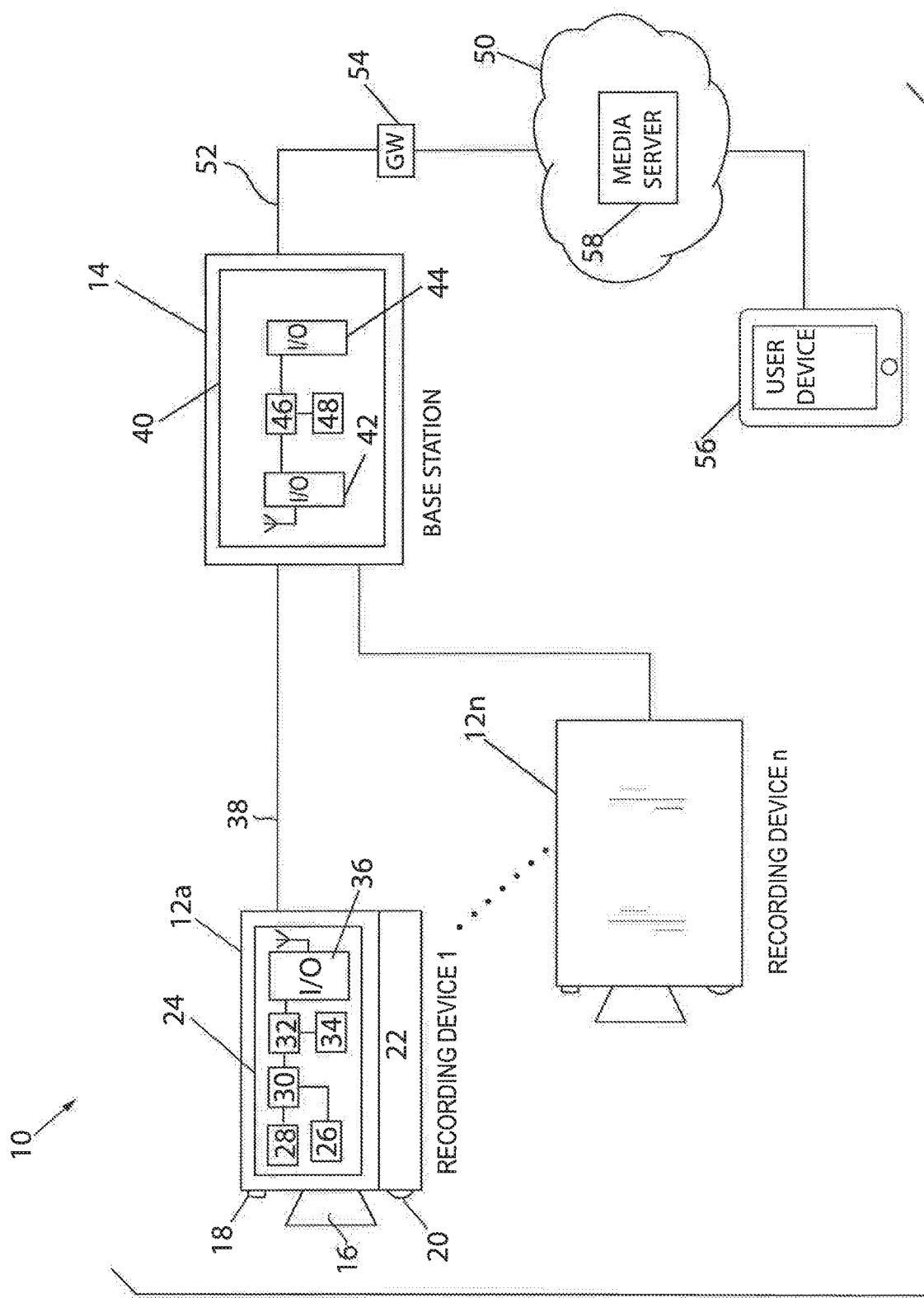
FIG. 1 is a schematic representation of a system for real-time monitoring, including multiple recording devices in communication with a base station, in accordance with an aspect of the invention.

Referring now to FIG. 1, in accordance with an aspect of the invention, an electronic system 10 for real-time monitoring can include multiple recording devices 12, such as a first recording device 12a through a last recording device 12n, in communication with a base station 14. Each recording device 12 could be a wired or wireless digital video recording device including a camera 16, microphone 18, visible and/or infrared (IR) lights 20, power supply 22 and/or recording device electronic circuitry 24, including an imager 26, audio circuit 28, media encoder 30, processor 32, non-transient memory storage 34 and/or wireless I/O communication device 36, among other things. Each recording device 12 can be in communication with the base station 14 through a network such as a private Wireless Local Area Network (WLAN) 38, hosted by the base station 14 operating as an access point. One such network such as an IEEE 802.11 network.

The base station 14 can include base station electronic circuitry 40, including a first wireless I/O communication device 42 for communicating with the recording devices 12 over the WLAN 38, a second wired or wireless I/O communication device 44 for accessing a Wide Area Network (WAN) 50, such as the Internet through a Local Area Network (LAN) 52 connected to a Gateway and/or Router 54, a processor 46 and/or a non-transient memory storage 48, among other things. It should be apparent that "circuitry" in the regard can comprise hardware, firmware, software, or any combination thereof. In one aspect, the recording devices 12 could be Arlo cameras, and the base station 14 could be an Arlo base station, each as part of an Arlo Smart Security System as available from Netgear, Inc. of San Jose, Calif.

In operation, each recording device 12 can be configured though suitable mounting of the recording device 12 and/or through suitable manipulation of its controls, to monitor an area of interest, such as a part of a building or section of property. When a recording device 12 is commanded by a user-operated device, such as a smart phone, tablet, laptop, PC or other user's device 56 communicating with the base station 14 through the WAN 50, and/or when a recording device 12 independently detects motion and/or sound, the recording device 12 can live video and/or audio ("media") stream motion and/or sound captured in real-time back to the base station 14 and ultimately the user's device 56.

In particular, the processor 32 of a recording device 12 can execute a program stored in the non-transient memory storage 34 to respond to a command from a user and/or independently detect motion and/or sound. The camera 16 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Each media packet includes a sequence number indicating a relative order of the media packet in the encoded media stream for live streaming. As configured, under control of the processor 32 executing the program, the encoded media stream can be transmitted from the wireless I/O communication device 36 to the base station 14.

The media encoder 30 can use the Real-time Transport Protocol (RTP) to produce the media packets as RTP packets. In one aspect, the media encoder 30 can prepare the encoded media stream using H.264, a well-known block-oriented motion-compensation-based video compression standard. Also, in delivering the encoded media stream, the recording device 12 can operate as a server according to the Real Time Streaming Protocol (RTSP), a network control protocol designed for use in entertainment and communications systems to control streaming media servers. Each recording device 12 can wirelessly transmit media packets to the base station 14 over a dedicated User Data ram Protocol (UDP) connection between the recording device 12 and the base station 14.

The processor 46 of the base station 14 can execute a program stored in the non-transient memory storage 48 to wirelessly receive the media packets from the recording device 12 in the encoded media stream, correct the encoded media stream, and send the corrected encoded media stream to a media server 58 hosted in the WAN 50. Accordingly, the base station 14 need not acknowledge every media packet received from a recording device 12. Instead, the base station 14 can perform a backward error correction by identifying missing media packets in the encoded media stream by detecting gaps between sequence numbers of media packets received by the base station 14, and after detecting such gaps, the base station 14 can wirelessly transmit a message to the recording device 12 requesting re-transmission of the missing media packets having sequence numbers corresponding to the gaps.

In receiving the encoded media stream from the recording device 12, the base station 14 can operate as an RTSP client of the recording device 12. In addition, in delivering the corrected encoded media stream to the media server 58, the base station 14 can operate as an RTSP client to the media server 58, pushing content to the media server 58. The media server 58, in turn, can operate as an RTSP server for the user's device 56 to provide real-time streaming to the user.

Figure 2:
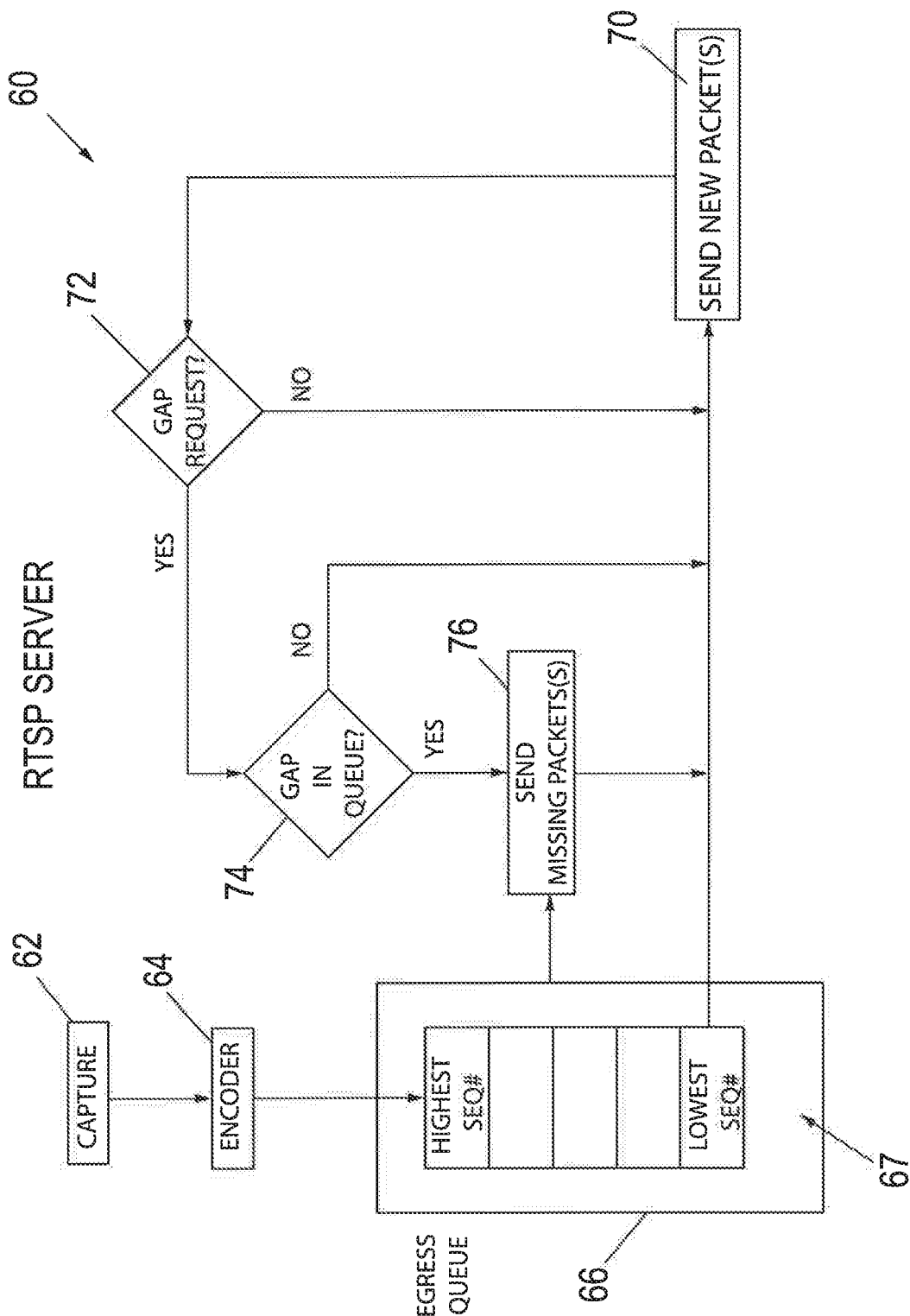
FIG. 2 is a flow diagram illustrating control of a recording device configured to wirelessly transmit media packets in an encoded media stream to a base station in the system of FIG. 1.

Referring now to FIG. 2, a flow diagram 60 illustrating control of a recording device 12, operating as an RTSP server (for the base station 14), is provided in accordance with an aspect of the invention. At block 62, the recording device 12 can capture a raw media stream from the camera 16 and/or the microphone 18 and the audio circuit 28. At block 64, the raw media stream can be provided to the media encoder 30 for producing media packets with sequence numbers providing a relative order in an encoded media stream. The media packets can include video packets in an encoded video stream synchronized with audio packets in an encoded audio stream.

Next, at block 66, the media encoder 30, can store the media packets in a recording device egress queue 67. The recording device egress queue 67 can be a first-in, first-out (FIFO) memory structure large enough to store a sufficient number of media packets to construct at least one group of pictures (GOP), such as an "I-frame" or intra coded picture (a frame that does not require other frames to decode) and multiple "P-frames" or predictive coded pictures (frames that require prior decoding of an I-frame in order to decode). The media packets can be continuously added to the recording device egress queue 67 while streaming, with media packets having lowest sequence numbers being first-in and first-streamed-out. After streaming-out, such media packets are retained in the recording device egress queue 67 until the size of the recording device egress queue 67 requires their removal to make room for newer media packets. This process is referred to as aging out.

Next, at block 70, the recording device 12 wirelessly transmits one or more new media packets to the base station 14. At decision block 72, the recording device 12 can determine whether a gap request has been received from the base station 14. If no gap request has been received ("No"), the recording device 12 can return to block 70 to continue wirelessly transmitting one or more new media packets to the base station 14, thereby continuing to send media packets from the recording device egress queue 67. This loop can repeat as long as no gap requests have been received.

However, if at decision block 72 the recording device 12 determines that a gap request was received from the base station 14 ("Yes"), the recording device 12 can instead move to decision block 74. At decision block 74, the recording device 12 can determine whether the recording device egress queue 67 still includes media packets having sequence numbers corresponding to gaps requested by the base station 14 for re-transmission. If the recording device egress queue 67 does not include any media packets having sequence numbers corresponding to a gap ("No"), the recording device 12 can return to block 70 to continue wirelessly transmitting one or more new media packets to the base station 14. This can occur when a requested media packet has already aged out of the recording device egress queue 67. Accordingly, in this circumstance, the recording device 12 simply disregards the gap request, without acknowledgement.

However, if the recording device egress queue 67 does include at least one media packet having a sequence number corresponding to a gap ("Yes"), at block 76, the recording device 12 can wirelessly re-transmit as many of the media packets having sequence numbers corresponding to gaps as stored in the recording device egress queue 67. The recording device 12 can then return to block 70 to continue wirelessly transmitting one or more new media packets to the base station 14 from the recording device egress queue 67. This loop can repeat, transmitting new media packets, checking for gap requests, checking for stored media packets corresponding to gaps, and/or re-transmitting missing media packets still in the recording device egress queue 67, while streaming.

Figure 3:
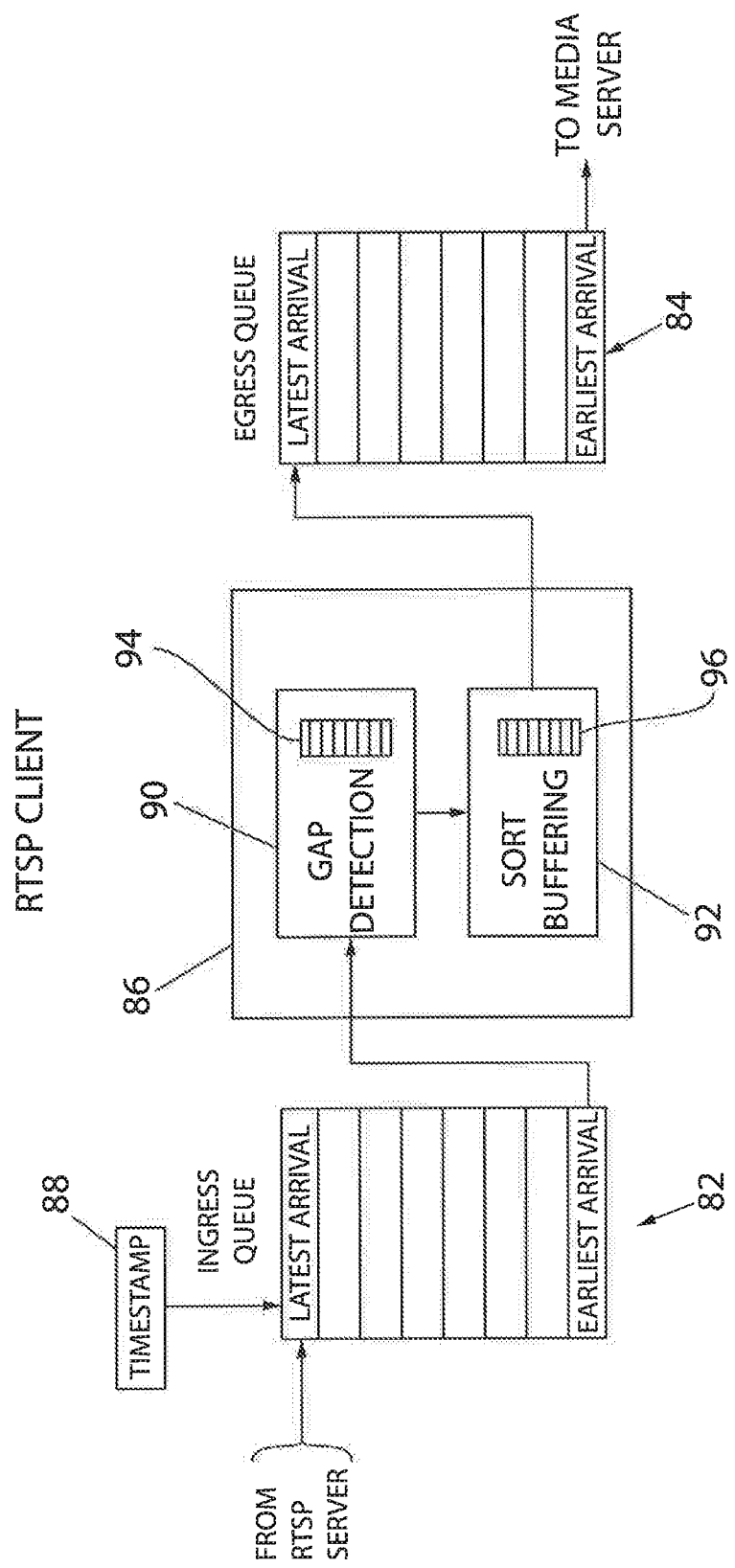
FIG. 3 is a flow diagram illustrating control of the base station configured to wirelessly receive media packets from a recording device in the system of FIG. 1.

Referring now to FIG. 3, a flow diagram illustrating control of the base station 14, operating as an RTSP client (of the recording device 12), is provided in accordance with an aspect of the invention. The base station 14 can include a base station ingress queue 82 for receiving media packets in an encoded media stream from the recording device 12, and a base station egress queue 84 for flushing media packets in a corrected encoded media stream to the media server 58. The base station ingress queue 82 and the base station egress queue 84 can each be FIFO memory structures. Accordingly, as latest arrival (higher sequence number) media packets arrive at the base station ingress queue 82 from the recording device 12, earliest arrival (lowest sequence number) media packets can be taken from the base station ingress queue 82 for base station processing 86.

Similarly, as latest arrival (higher sequence number) media packets are sent to the base station egress queue 84 from the base station processing 86, earliest arrival (lowest sequence number) media packets at the base station egress queue 84 can be flushed to the media server 58 and, in turn, the user's device 56. In addition, the base station 14 can apply a real-time clock to timestamp 88 each media packet upon arrival at the base station ingress queue 82.

In one aspect, the base station processing 86 can include a gap detection stage 90 followed by a sort buffering stage 92. The gap detection stage 90 can identify missing media packets in the encoded media stream by detecting gaps between sequence numbers of media packets received by the base station 14 at the base station ingress queue 82. Each time a gap is identified, the gap can be logged in a gap queue 94. After a gap request is sent back to the recording device 12, the gap queue can be flushed. The sort buffering stage 92 can sort media packets in priority order in a priority queue 96. The sort buffering stage 92 can flush media packets to the base station egress queue 84 in a corrected encoded media stream.

Figure 4:
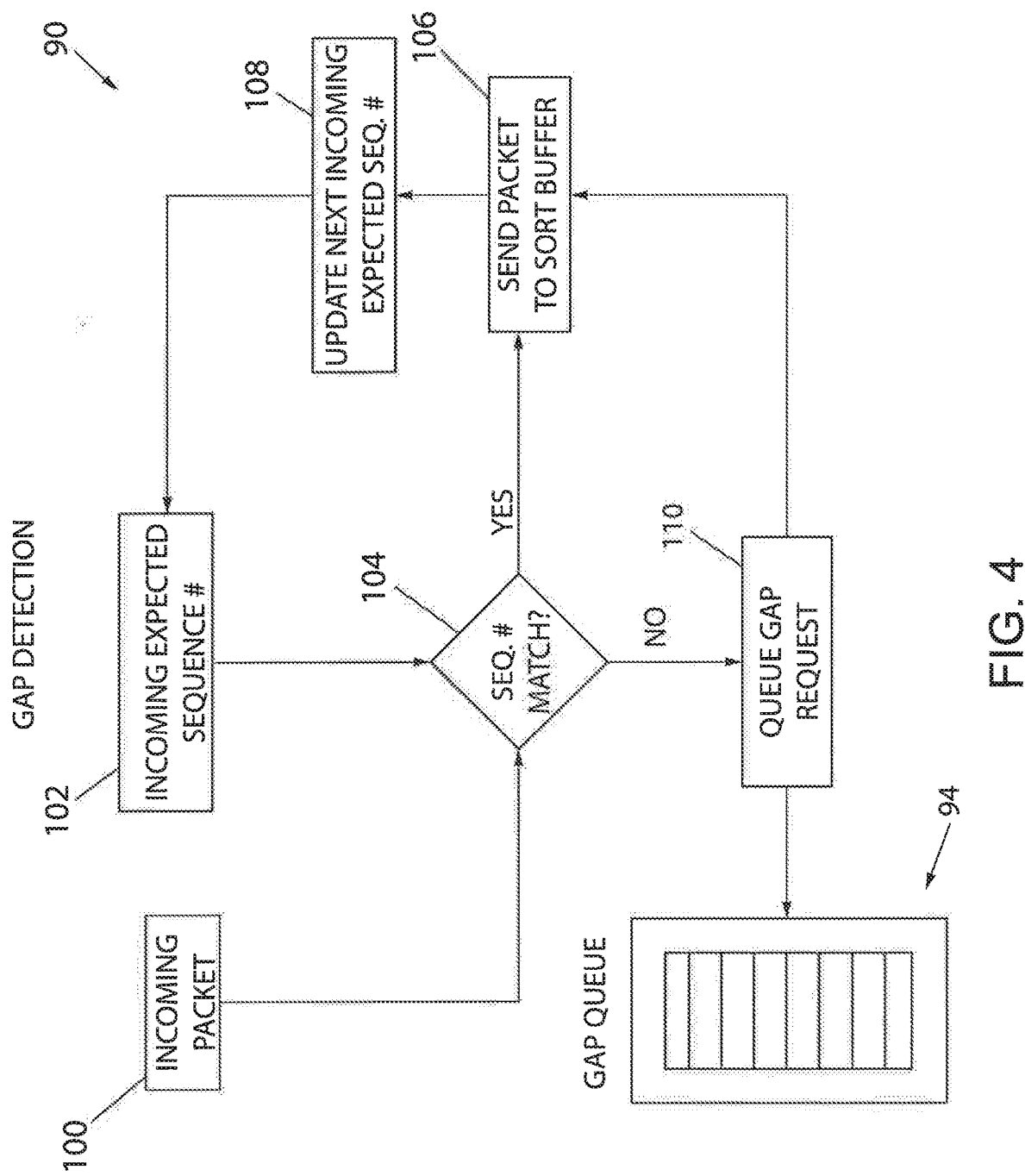
FIG. 4 is a flow diagram illustrating detection of gaps between sequence numbers of media packets received by the base station in accordance with an aspect of the invention.

With additional reference to FIG. 4, in the gap detection stage 90, at block 100, an earliest arrival (lowest sequence number) media packet can be taken from the base station ingress queue 82 for applying to a comparator at decision step 104. At block 102, an incoming expected sequence number can also be applied to the comparator at decision step 104 for comparing to a sequence number of the media packet from block 100. If, at decision step 104, the sequence number of the media packet from block 100 matches the incoming expected sequence number from block 102 ("Yes"), the media packet can be forwarded to the sort buffering stage 92 at block 106. Then, the incoming expected sequence number can be updated for the next sequential media packet at block 108, and a next media packet can be compared to the next incoming expected sequence number at the decision step 104. This loop can continue as long as no gaps are detected, and media packets remain in the base station ingress queue 82.

However, if at the decision step 104 the sequence number of a media packet from block 100 fails to match the incoming expected sequence number from block 102 ("No"), a sequence number gap can be identified at block 110 for preparing a message requesting a re-transmission corresponding to gap(s). In addition, if the sequence number of the media packet from block 100 fails to match the incoming expected sequence number by a value greater than 1, a gap comprising a continuous range of sequence numbers can be identified. The gap can be logged in the gap queue 94. Then, the media packet from block 100, regardless of causing a gap, can be forwarded to the sort buffering stage 92 at block 106. Then, the incoming expected sequence number can be updated for the next sequential media packet at block 108, based on the media packet causing the gap. A next media packet can then be compared at the decision step 104. This loop can repeat, comparing media packets, logging gaps, and forwarding media packets to the sort buffering stage 92.

In the event that a sequence number of a media packet from block 100 is less than the incoming expected sequence number from block 102, the incoming media packet can be treated as a retransmission of a previously missing media packet. Accordingly, the incoming media packet can be sent to the sort buffering stage 92 without updating for the next sequential media packet at block 108.

Figure 5:
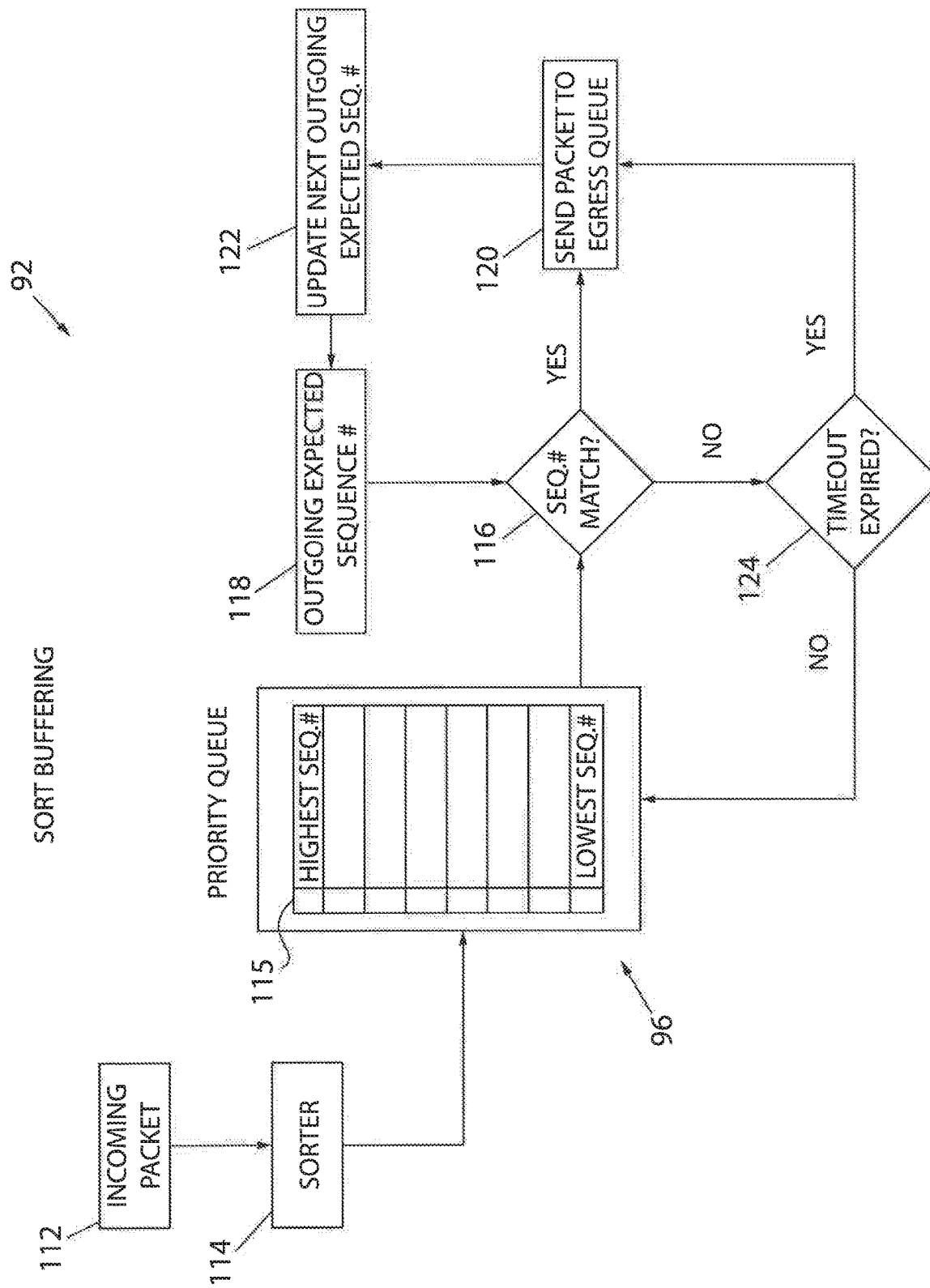
FIG. 5 is a flow diagram illustrating sorting of media packets received by the base station in accordance with an aspect of the invention.

With additional reference to FIG. 5, in the sort buffering stage 92, at block 112, media packets can be received from the gap detection stage 90. At block 114, a sorter can execute to insert the media packets in priority order in the priority queue 96, along with timestamps 115 from the timestamp 88 (FIG. 3). Accordingly, media packets in the priority queue 96 can be ordered from highest sequence numbers (latest arrivals) to lowest sequence numbers (earliest arrivals). Then, at decision step 116, a media packet having a lowest sequence number can be taken from the priority queue 96 and applied to a comparator. At block 118, an outgoing expected sequence number can also be applied to the comparator at decision step 116 for comparing to the lowest sequence number from the priority queue 96. If, at decision step 116, the lowest sequence number from the priority queue 96 matches the outgoing sequence number from block 118 ("Yes"), the media packet can be forwarded to the base station egress queue 84 at block 120. Then, the outgoing expected sequence number can be updated for the next sequential media packet at blocks 122 and 118, and a next lowest sequence for a media packet from the priority queue 96 can be compared to the updated outgoing expected sequence number at the decision step 116. This loop can continue as long as the outgoing expected sequence matches the lowest sequence number for a media packet in the priority queue 96.

However, if at the decision step 116 the lowest sequence number from the priority queue 96 fails to match the outgoing expected sequence number from block 118 ("No"), the sort buffering stage 92 can then determine whether a predetermined amount of time (a sort buffer time-out) has elapsed from receipt of the media packet by checking the timestamp 115 for the media packet. If the predetermined amount of time has not yet elapsed ("No"), the sort buffering stage 92 can return to the priority queue 96 to check for an updated media packet having a different lowest sequence number. If an updated media packet having a different lowest sequence number has not arrived, or if an updated media packet having a different lowest sequence number has arrived but the updated lowest sequence number still does not match the outgoing expected sequence number ("No"), the sort buffering stage 92 can continue waiting in a loop, still checking for an updated media packet having a different lowest sequence number. This loop can continue, between decision steps 116 and 124, until an updated media packet having a different lowest sequence number has arrived and the updated lowest sequence number matches the outgoing expected sequence number at decision step 116, or until the predetermined amount of time has elapsed at decision step 124. If an updated media packet having a different lowest sequence number has arrived, the updated media packet, and the media packet causing the loop, can be forwarded to the base station egress queue 84 at block 120. If an updated media packet does not arrive, but the predetermined amount of time has elapsed, the media packet causing the loop can be forwarded to the base station egress queue 84 at block 120. Then, the outgoing expected sequence number can be updated for comparing to the next lowest sequence number from the priority queue 96. This loop can repeat, comparing media packets, waiting for gaps, and forwarding media packets to the base station egress queue 84. In one aspect, the predetermined amount of time could be 900 milliseconds.

Figure 6:
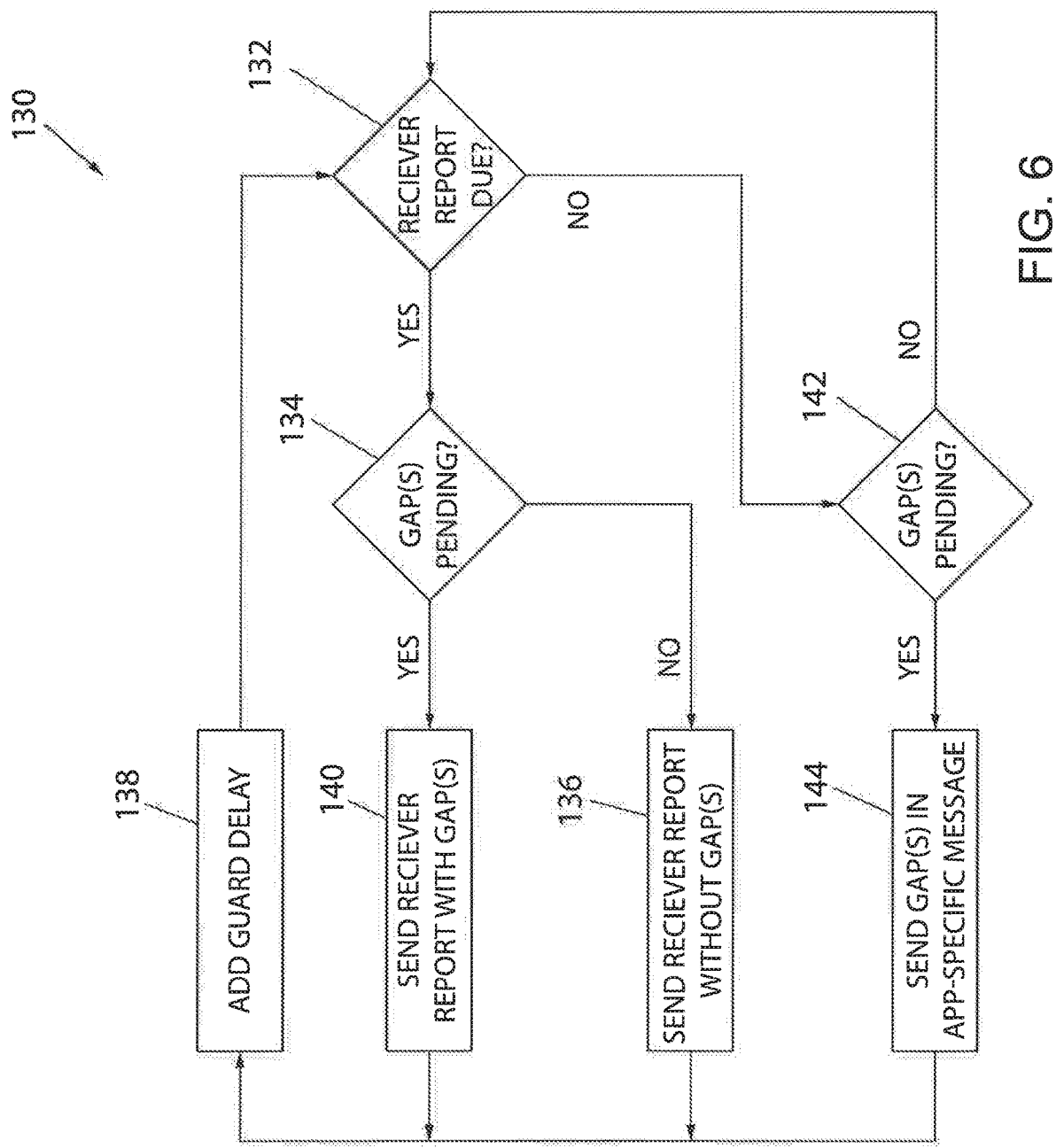
FIG. 6 is a flow diagram illustrating scheduling for requesting a recording device to re-transmit missing media packets in accordance with an aspect of the invention.

Referring now to FIG. 6, is a flow diagram 130 illustrates scheduling by the base station 14 for requesting the recording device 12 to re-transmit missing media packets in accordance with an aspect of the invention. At decision block 132, the base station processing 86 can determine whether a receiver report is due. The base station 14 can send periodic receiver reports to the recording device 12 providing statistics and/or control information for communications between the base station 14 and the recording device 12. Preferably, with the recording device 12 transmitting RTP packets, the base station 14 can use the RTP Control Protocol (RTCP) protocol to send the periodic receiver reports as RTCP reports. RTCP is a well-known sister protocol of RTP for providing out-of-band statistics and/or control information for an RTP session. If at decision block 132 it is determined that a receiver report is due ("Yes"), the base station processing 86 can next determine whether any gaps are pending in the gap queue 94. If there are no gaps pending ("No"), then the base station 14 can send the receiver report at block 136, and at block 138, the base station 14 can add a guard time to delay any subsequent messages to avoid network congestion. However, if at decision block 134 it is determined there is at least one gap pending ("Yes"), then the base station 14 can send the receiver report at block 140 with a message requesting the recording device 12 to re-transmit one or more missing media packets having sequence numbers corresponding to the one or more gaps. Then, at block 138, the base station 14 can add a guard time to delay any subsequent messages to avoid network congestion. In one aspect, the guard time could be 50 milliseconds.

On the other hand, if at decision block 142 it is determined that a receiver report is not due ("No"), the base station can proceed to decision block 142 to determine whether any gaps are pending in the gap queue 94. If there are no gaps pending ("No"), then the base station 14 can return to the decision block 142 in a loop until either a receiver report comes due or a gap is pending. However, if at decision block 142 it is determined there is at least one gap pending ("Yes"), then the base station 14 can send an application-specific message between the periodic reports to the recording device 12 at block 144. The application-specific message can be the message requesting the recording device 12 to re-transmit one or more missing media packets having sequence numbers corresponding to the one or more gaps. Then, base station 14 can return to block 138 to add a guard time to delay any subsequent messages to avoid network congestion. This loop can repeat, sending periodic receiver reports, including with gap requests when pending, and sending messages with gap requests in between receiver reports when receiver reports are not due, with guard times between messages to avoid network congestion.

The message from the base station 14 requesting the recording device 12 to re-transmit the missing media packets can advantageously include multiple gaps in a single message. The multiple gaps can correspond to non-contiguous media packets. For example, the single message can include a request for re-transmission of a first group of media packets in a first range, such as media packets have sequence numbers corresponding to 11115 through 11118; a second group of media packets in a second range that is non-contiguous to the first range, such as media packets have sequence numbers corresponding to 11181 through 11185; and a third media packet that is non-contiguous to the first and second ranges, such as a media packet having a sequence number corresponding to 11196; and so forth.

Figure 7:
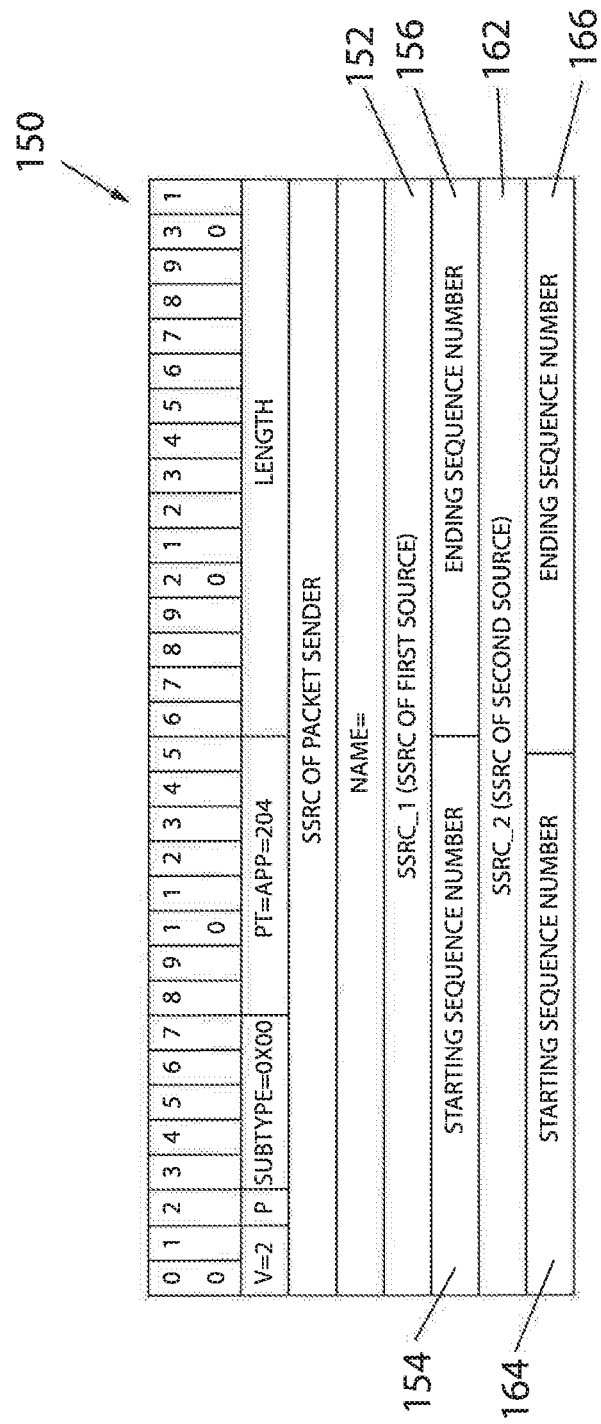
FIG. 7 is an exemplar data field illustrating a payload for the base station to request re-transmission of multiple missing media packets from a recording device in a single application-specific message in accordance with an aspect of the invention.

Preferably, the application-specific message can be an RTCP application-specific message. With additional reference to FIG. 7, an exemplar data field 150 illustrates a payload for the base station 14 to request re-transmission of multiple missing media packets from a recording device 12 in a single application-specific RTCP message. A first synchronization source identifier field 152 can identify an originator of a first gap, such as the first recording device 12a. Starting and ending sequence numbers 154 and 156, respectively, of the first gap can be identified in separate fields for the first synchronization source. For example, to request re-transmission of the first group of media packets in a first range having sequence numbers corresponding to 11115 through 11118, the starting sequence number 154 could contain 11115 and the ending sequence number 156 could contain 11118. Similarly, in the same message, a second synchronization source identifier field 162 can identify an originator of a second gap, followed by starting and ending sequence numbers 164 and 166, respectively. For example, to request re-transmission of the second group of media packets in a second range having sequence numbers corresponding to 11181 through 11185, the starting sequence number 164 could contain 11181 and the ending sequence number 166 could contain 11185.

Preferably, the RTCP application-specific message can be specific to a single recording device 12. Accordingly, separate recording devices 12 can have separate RTP and RTCP connections, and the synchronization source identifier can identify audio and/or video tracks within a media stream for a single recording device 12.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:
1. A system for real-time monitoring, comprising:
a base station configured to wirelessly receive media packets from a recording device and configured to not acknowledge every media packet received from the recording device; and
the recording device configured to maintain an egress queue for transmitting media packets to the base station, wherein the media packets are stored in the egress queue after transmission to the base station, wherein:
each media packet includes a sequence number indicating a relative order of the media packet in an encoded media stream,
the base station is further configured to identify a plurality of missing media packets in the encoded media stream by detecting a plurality of gaps between sequence numbers of media packets received,
the base station, upon detecting the plurality of gaps, is further configured to wirelessly transmit a message requesting the recording device to re-transmit the plurality of missing media packets having sequence numbers corresponding to the plurality of gaps,
upon receiving the message, the recording device is configured to compare the sequence numbers corresponding to the plurality of gaps to sequence numbers of media packets stored in the egress queue,
upon determining at least one missing media packet corresponding to a gap to be in the egress queue, the recording device is configured to re-transmit the at least one missing media packet which is stored in the egress queue to the base station, the recording device is a Real Time Streaming Protocol (RTSP) server, and the base station is an RTSP client.

2. The system of claim 1, wherein the base station is configured to compare sequence numbers of media packets arriving at the base station to incoming expected sequence numbers for detecting the plurality of gaps.

3. The system of claim 1, wherein the base station is configured to:

sort media packets received in a priority queue according to sequence number, compare lowest sequence numbers of media packets in the priority queue to outgoing expected sequence numbers, and upon failing to detect a match, wait a predetermined amount of time for a media packet having a sequence number matching the outgoing expected sequence number to arrive before sending the message having a sequence number failing to match the outgoing expected sequence number to the recording device.

4. The system of claim 1, wherein the recording device is configured to transmit media packets using Real-time Transport Protocol (RTP), and wherein the base station is configured to send the message using Real-time Transport Protocol Control Protocol (RTCP).

5. The system of claim 4, wherein the base station is configured to send the message in a periodic RTCP report to the recording device providing at least one of statistics and control information for communications between the base station and the recording device.

6. The system of claim 4, wherein the base station is configured to send an application-specific message between periodic RTCP reports to the recording device providing at least one of statistics and control information for communications between the base station and the recording device.

7. The system of claim 6, wherein the base station is configured to implement a guard time for transmitting the message.

8. The system of claim 7, wherein the guard time is at least 50 milliseconds.

9. The system of claim 1, further comprising a plurality of recording devices, wherein each recording device wirelessly transmits media packets to the base station using RTP over a dedicated User Datagram Protocol (UDP) connection between each recording device and the base station.

10. The system of claim 1, wherein the media packets comprise video packets in an encoded video stream and audio packets in an encoded audio stream.

11. The system of claim 1 wherein the recording device is further configured to disregard the message from the base station when the at least one missing media packet is no longer in the egress queue.

12. A method for real-time monitoring, comprising:

wirelessly transmitting media packets in an encoded media stream from a recording device to a base station, the recording device comprising a Real Time Streaming Protocol (RTSP) server and the base station comprising an RTSP client, wherein each media packet includes a sequence number indicating a relative order of the media packet in the encoded media stream;

maintaining an egress queue on the recording device, wherein the egress queue is used for transmitting media packets to the base station and for storing the media packets after transmission to the base station;

wirelessly receiving media packets from the recording device at the base station, wherein the base station does not acknowledge every media packet received from the recording device;

identifying a plurality of missing media packets in the encoded media stream at the base station by detecting a plurality of gaps between sequence numbers of media packets received by the base station;

upon detecting the plurality of gaps, wirelessly transmitting from the base station a message requesting the recording device to re-transmit the plurality of missing media packets having sequence numbers corresponding to the plurality of gaps, wherein the base station provides backward error correction by failing to acknowledge receipt of media packets and by requesting re-transmission from the recording device of media packets identified by the base station to be missing media packets from the recording device;

comparing the sequence numbers corresponding to the plurality of gaps to sequence numbers of media packets stored in the egress queue with the recording device; and upon determining at least one missing media packet corresponding to a gap to be in the egress queue, re-transmitting the at least one missing media packet which is stored in the egress queue from the recording device to the base station.

13. The method of claim 12 further comprising the step of disregarding the message from the base station at the recording device when the at least one missing media packet is no longer in the egress queue.

14. The method of claim 13, further comprising comparing sequence numbers of media packets arriving at the base station to incoming expected sequence numbers for detecting the plurality of gaps.

15. The method of claim 14, further comprising, using the base station, sorting media packets received from the recording device in a priority queue according to sequence number, and the base station comparing lowest sequence numbers of media packets in the priority queue to outgoing expected sequence numbers and, upon failing to detect a match, waiting a predetermined amount of time for a media packet having a sequence number matching the outgoing expected sequence number to arrive before sending the message having a sequence number failing to match the outgoing expected sequence number to the recording device.

16. The method of claim 13, further comprising, using the base station, implementing a minimum guard time for transmitting the message.

17. The method of claim 16, further comprising, using the base station, sending periodic reports to the recording device providing at least one of statistics and control information for communications between the base station and the recording device, and the base station transmitting the message between periodic reports in an application-specific message.

18. The method of claim 12, wherein the media packets comprise video packets in an encoded video stream and audio packets in an encoded audio stream.

* * * * *